United States Patent [19]

Williams

[11] Patent Number: 4,950,166
[45] Date of Patent: Aug. 21, 1990

[54] EDUCATIONAL KIT FOR FAST CYCLING PLANTS

[75] Inventor: Paul H. Williams, Madison, Wis.

[73] Assignee: Wisconsin Alumni Research Foundation, Madison, Wis.

[21] Appl. No.: 323,209

[22] Filed: Mar. 13, 1989

Related U.S. Application Data

[63] Continuation of Ser. No. 934,403, Nov. 24, 1986, abandoned.

[51] Int. Cl.[5] ............................................. G09B 23/00
[52] U.S. Cl. ........................................ 434/276; 47/81
[58] Field of Search ............................ 47/81; 434/276

[56] References Cited

U.S. PATENT DOCUMENTS

| | | | |
|---|---|---|---|
| 262,379 | 8/1882 | Dean | 47/81 |
| 2,300,776 | 11/1942 | Collins | 47/81 |
| 2,993,300 | 7/1961 | Sawyer | 434/276 |
| 4,287,682 | 9/1981 | Browne | 47/81 |
| 4,299,054 | 11/1981 | Ware | 47/81 |
| 4,378,655 | 4/1983 | Johnson | 47/58 |
| 4,499,687 | 2/1985 | Lawrence, Jr. et al. | 47/58 |

FOREIGN PATENT DOCUMENTS 2554982  6/1977  Fed. Rep. of Germany .......... 47/81

OTHER PUBLICATIONS

"Scientist Develops Rapid-Cycling Plants as Research", Teaching Tool, *Broadcast News* (Jun. 6, 7, 1985).
"Scientist Develops Rapid-Cycling Plants as Research, Teaching Tool," Gallepp, G., *Science Report* (May 29, 1985).
*Science*, vol. 232, pp. 1385-1389, Rapid-Cycling Populations of Brassica, Williams and Hill, Jun. 1986.
*Touchtone*, vol. 19, No. 2, pp. 2-5, Life in the Fast Lane, Paul L. duBreuil, Nov. 1985.
*CrGC Resource Book*, 1985, Paul H. Williams.

Primary Examiner—Charles T. Jordan
Assistant Examiner—Richard W. Wendtland
Attorney, Agent, or Firm—Quarles & Brady

[57] ABSTRACT

An educational kit for the classroom study of plants including a compact plant growth environment and a seed of fast-cycling Brassica plants. The fast-cycling plants grow in compact areas and have generation cycle times of sixty days or less making them convenient for classroom study. Various experiments on plant growth, physiology and genetics can be performed with the kits.

18 Claims, 2 Drawing Sheets

EDUCATIONAL KIT FOR FAST CYCLING PLANTS

This application is a continuation of application Ser. No. 06/934,403, filed Nov. 24, 1986 now abandoned.

FIELD OF THE INVENTION

The present invention relates to educational kits for classroom teaching in general, and relates, in particular, to educational kits for use in teaching the principles of botany and genetics to elementary or secondary school students.

BACKGROUND OF THE INVENTION

In the teaching of biology to primary and secondary school students it is essential if students are to have a good feel and understanding of the science that they have an opportunity to work with and utilize living materials. Most biology courses lack convenient living materials to use in their course work and, in addition, most biology courses use animal subjects predominately. At an elementary and secondary school level, it is generally considered impractical to teach general or advance courses in botany, genetics, science education, or applied plant sciences because of the difficulty in finding suitable living plant material that would permit students to explore plant growth development, physiology, reproduction, genetics, evolution and ecology. Such studies are normally difficult to perform in an educational setting because the life cycle of most plants is of sufficiently long duration that multiple generations cannot conveniently be grown during any time period convenient to an educational schedule.

Traditionally one of the difficulties in performing research or breeding development in plant species is the long time periods necessary to perform breeding projects in plant species. Since genetic experiments typically require many generations of individuals with appropriately selected cross-breeding among individuals with particular traits, many years of work are necessary if only one, or a relatively few generations, of plants complete their life cycle during any given year. Accordingly, it was perceived as useful to generate plants which would have a shorter life cycle, so that more generations of plants could be grown up and selectively cross-bred in a shorter period of time.

A series of short life cycle plants, referred to as rapid-cycling plants, has been developed for plants in the family Cruciferae. Plants of this family are familiarly referred to as Crucifers because of the four petalled flowers, which are deemed to resemble a cross or crucifix. The Crucifer family is so large that it is broken into sub-groups, referred to as tribes. One of the tribes of Crucifer plants is the Brassicae tribe. The genus Brassica includes a variety of plants of commercial utility, such as mustard, brussel sprouts, cabbage, kale, cauliflower, broccoli, and rape. A related genus is Raphanus which is represented in commercial crop species by the radish. Rapid cycling sub-populations have been generated in populations of the genus Brassica as well as the genus Raphanus. The cytogenetic interrelationships among six Brassica species and Raphanus are illustrated graphically by the following chart, in which cytoplasmic genome is designated by capital letters and nuclear genome is designated by lower case letters, and where a indicates 10, b indicates 8 and c and r indicate 9 chromosomes.

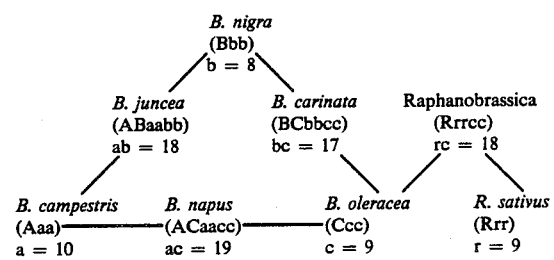

A rapid cycling population of plants has been developed for each of these species (not for Raphanobrassica). Each of the populations grows rapidly and flowers in a time period of between sixteen and thirty days. Plants of these rapid-cycling populations average, depending on the species, between sixteen and thirty days to flower, between thirty-six and sixty days for an entire plant life cycle and between eighteen and one hundred and seven seeds produced from each plant. This allows for these population of plants to be cycled over six and ten successive generations per year.

Stocks of rapid cycling Brassica plants are maintained by the Crucifer Genetics Cooperative, 1630 Linden Drive, University of Wisconsin, Madison, Wis. 53706. The Cooperative publishes a Resource Book describing the manipulation and handling of fast cycling Crucifer stock and also maintains seed reserves of the stocks. Seeds are readily available to anyone interested in Brassica botany or genetics by application for membership to the cooperative, which is open to all. Stocks of the plants are thus readily available and obtainable and maintained indefinitely by the Cooperative.

SUMMARY OF THE INVENTION

The present invention is summarized in that an educational kit for the classroom study of plants comprises a compact plant growth environment including a physical container for receiving plants therein and a continuous watering system capable of providing liquid to plants in the container; and a quantity of seeds of fast-cycling Brassica plants, the seeds having been bred to develop into plants having a characteristic average optimal growing cycle of less than sixty (60) days and having a phenotype of educational interest.

It is an object of the present invention to provide a compact and easy to use educational kit for classroom study at elementary or secondary school level to study plant growth and plant genetics.

It is another object of the present invention to provide such an educational kit which allows for a variety of experiments to be performed with the same plant populations or with seeds of plants of varying genetic makeup in the rapid cycling background, with the same apparatus.

It is another object of the present invention to provide such an educational kit in which experiments can be accomplished in a relatively short period of time so that multiple generation experiments can be accomplished in the time period required by academic scheduling.

Other objects, advantages and features of the present invention will become apparent from the following specification.

DETAILED DESCRIPTION OF THE INVENTION

Figure 1:
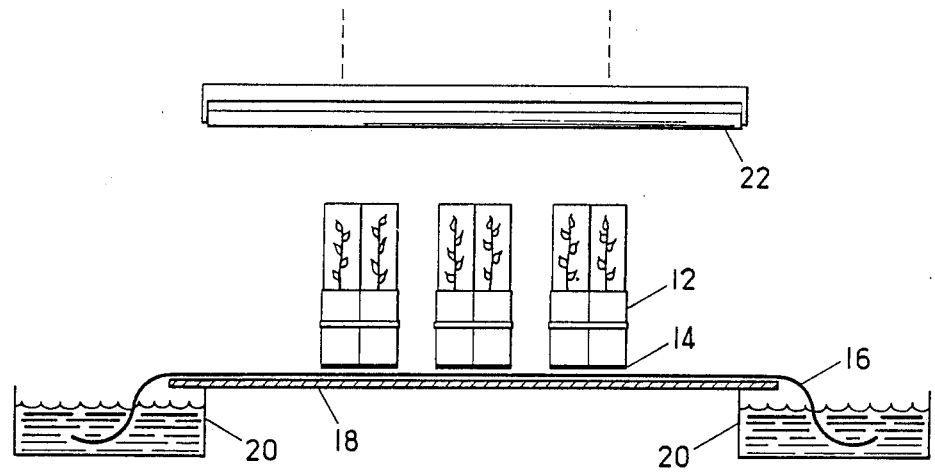
FIG. 1 is a plant elevation view of a plant growth environment suitable for use in the present invention.

The educational kit of the present invention is constructed to utilize fast growing and flowering plants from the Brassicae tribe. A series of such plants have been developed and their seeds are deposited with and available from the Crucifer Genetics Cooperative at the University of Wisconsin, Madison, Wis. These populations of Brassica species were methodically selected and bred from commonly available Brassica plant populations. Over 2,000 seed samples were obtained from the U.S. Department of Agriculture National Plant Germplasm System and were planted out. It was noted that a few of the plants in each species of Brassica flowered in a significantly shorter time than the mean of plants for each of those species. The fastest flowering plants from each species were cross-pollinated with each other to develop populations intended to be fast-cycling, so that they could be tailored strictly for experimental uses under laboratory conditions. To do so, generations of the fast flowering plants from each Brassica species were grown in high plant densities in 28 by 55 centimeter plastic multi-pots of 96 pots per tray. An artificial soil was used consisting of a one-to-one mixture of peat moss and vermiculite, and the plants were watered with a balanced nutrient solution. The plants were grown at room temperature and continuously illuminated with very high output fluorescent lamps with 250 micromoles per second per square meter of irradiance. Diverse populations were derived by interpollinating diverse early flowering types within each species. From the offspring thus produced individuals were selected for successive generations based on minimum time from sowing to flowering, rapid seed maturation, absence of seed dormancy, small plant size, and high female fertility. Plant populations of 288 plants or more were grown in each cycle of the reproduction and the 10% of each population that flowered the earliest was selected and mass pollinated for the next generation. This process was continued over generations until the average days to flowering became stabilized and when 50% of the population flowered within a 2 to 3 day period, at which point selection on the population was discontinued. The population within each species was then increased by mass pollination and designated as a rapid cycling base population. A rapid cycling base population for each of the six Brassica species and for the one Raphanus species indicated in FIG. 1 above was developed. Those rapid cycling population have been given numbers generated from the Crucifer Genetics Cooperative (CrGC 1 through 7). The characteristics are summarized in the following chart.

TABLE 2

| CrGC stock number | Species | Genome | Mean Days to flower | Mean Length (cm) to first flower | Mean Seeds per plant | Days for cycle | Cycles per year |
|---|---|---|---|---|---|---|---|
| 1. | B. campestris | Aaa | 16 | 11.9 | 78 | 36 | 10 |
| 2. | B. nigra | Bbb | 20 | 27.1 | 69 | 40 | 9 |
| 3. | B. oleracea | Ccc | 30 | 22.6 | 18 | 60 | 6 |
| 4. | B. juncea | ABaabb | 19 | 29.6 | 107 | 39 | 9 |
| 5. | B. napus | ACaacc | 25 | 35.3 | 76 | 55 | 6 |
| 6. | B. carinata | BCbbcc | 26 | 41.7 | 67 | 56 | 6 |
| 7. | R. sativus | Rrr | 19 | | | | |

Stocks of rapid-cycling base populations CrGc 1 through CrGC 7 are on deposit with and are maintained by the Crucifer Genetics Cooperative, 1630 Linden Drive, University of Wisconsin, Madison, Wis. 53706 and are readily available to the public.

These rapid cycling populations are homogeneous with respect to plant morphology and flowering time although they contain substantial genetic variation as revealed by isozyme variations among individuals. The individuals also demonstrate a wide variety of plant-to-plant disease susceptibility. It is believed that the base populations possess a significant reservoir of diverse genes useful to plant breeders themselves. Thus significant genetic variation occurs within the plant population which can be useful for experimental and pedagogical purposes.

As may be seen by the foregoing discussion, such rapid-cycling base populations can be readily generated from commonly available plant genetic stocks. While the readily available stocks from the Crucifer Genetics Cooperative are convenient to use, other similar rapid-cycling base populations can be readily created by following a similar breeding program.

Individual plants and sub-populations can be readily selected from these rapid-cycling plant populations on the basis of easily observable traits of educational interest. For example, plants can be selected from the general base population on the basis of response to a plant growth factor. Then, plants of the sub-population can be planted out in two groups, and plants in one of the groups can be exposed to the growth factor so that students can observe the change in growth pattern of the two groups of plants based on the effect. Some plant growth factors would have a positive effect on the treated plants. Examples of this type of growth factor include plant growth regulators or hormones, nutrients or symbionts. Other plant growth factors would adversely affect the treated plants. Such factors would include antibiotics, herbicides, parasites, pathogens, pests and competitive plants (i.e. weeds). To use the rapid-cycling base population plants in an educational kit illustrating the effect of such growth factors, the kit would not only include a supply of the growth factor, but the sub-population of plants would preferably be selected to be made up of plants highly responsive to the growth factors, positively or negatively, so that the classroom illustration of the effect would be as striking as possible.

Another sub-population of plants which would be preferred for selection for use in the present invention would be sub-populations having variant alleles of an easily observable phenotypic trait. Such traits exist with and without the base populations but can easily be transferred into any selected sub-population from other germplasm. For example, stocks exist in the Crucifer Genetics Cooperative of plants of the species of each of the rapid cycling base populations which have one specific easily observable phenotypic difference, petal color of the flowers. It is readily possible, particularly given the fast cycling time of the plants, to breed two subpopulations of a rapid cycling population differing only by petal color. Given seeds of each of these two sub-populations, students could make appropriate cross-breedings to demonstrate the rules of Mendelian population genetic inheritance. Inbred plant lines could be generated from such sub-populations which could then be bred to be either heterozygous or homozygous for the particular phenotypic trait sought so that individual plant-by-plant genetic experiments could be conducted as opposed to whole population studies of inheritance laws. A kit using such plants would normally include an allelic pairing of genes. It would be possible also to demonstrate the difference between nuclear and cytoplasmic genetic inheritance.

Figure 2:
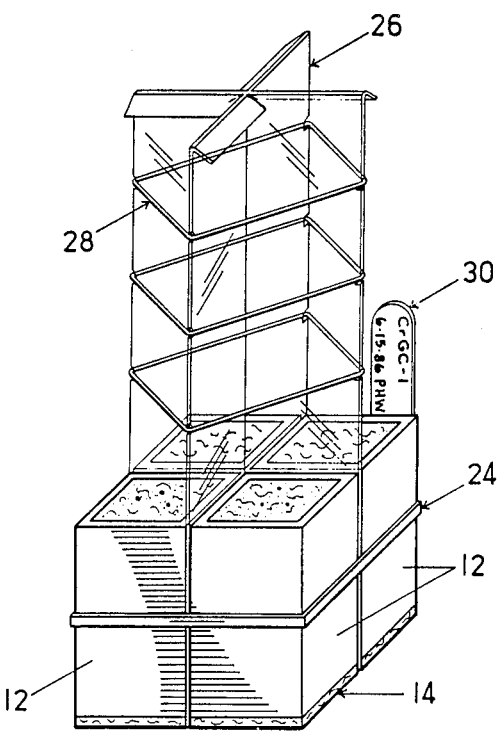
FIG. 2 is a perspective view of a four-unit plant container for the environment of FIG. 1.

In order to effectively use the rapid cycling base population plants within the present invention, it is necessary to have a compact plant growth environment suitable for use in a relatively easy manner in a classroom at elementary or secondary school level. The plant growth environment must include a physical support system suitable for containing plants therein. A suitable plant growth environment is schematically illustrated in FIG. 1. As viewed in FIG. 1, the plant environment includes a plurality of individual plant containers, in the form of plant minipots, 12 bundled in groups of four. The plant containers 12, which are also illustrated in FIG. 2, are formed as a minipot having a rigid exterior supporting shape and an interior cavity extending vertically through it, into which a soil mixture can be placed. The minipots 12 also include on their bottom, as can be viewed in FIG. 2, a porous bottom pad 14 formed of absorbent material. As can be viewed in FIG. 1, the plant minipots 12 sit upon a common porous wicking pad 16. The wicking pad 16 is supported on a platform 18, but extends off of both sides thereof. The ends of the wicking pads, extending off of the platform 18, are contained within the water reservoirs 20 located on either side of the platform 18. Alternatively, one large reservoir 20 could extend completely underneath and out adjacent both sides of the platform 18. Located a short distance above the plants themselves is a bank of fluorescent lights, indicated at 22. The lights 22 are preferably cool white flourescent tubes mounted parallel, separated two and one-half to three inches apart, and maintained 2 to 3 inches above the tallest plant.

Shown in FIG. 2 is a more detailed illustration of a typical four unit assembly of plant containers 12. Four of the plant minipot containers 12 are joined in the common unit, e.g. by a rubber band 24 placed around the exterior thereof. In between the minipots 12 a pair of vertical plastic separators 26 have been placed extending vertically upward between the individual plant pots 12. The plant separators 26 have notched edges so that a plurality of horizontal strings 28 can be extended therebetween the notches to provide a trellis onto which the plants may climb. Alternatively, plants may be tied to small bamboo sticks inserted in the soil. A pot label 30 is provided to label the plants in the minipot grouping.

Figure 3:
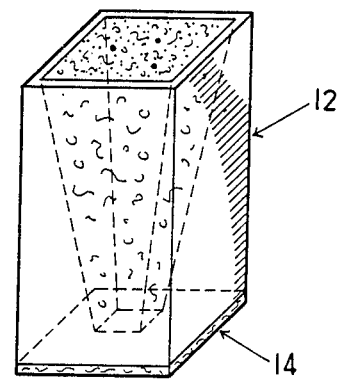
FIG. 3 is a perspective view of a minipot such as is used in FIGS. 2 and 3.

Individual plants when potted into the mini-pots illustrated in FIGS. 1 to 3, and if they are to be husbanded for optimal growth, should be cultivated in a rich soil mixture. The soil mixture which has been found optimal for the base populations of rapid-cycling plants has been found to contain one part compost top soil, one part sphagnum peat moss finely screened, one part perlite, and one part vermiculite, to which is added a very small amount of trace elements which are sold commercially in a wide variety of formulations, such as Esmigran. The soil mixture may be pasteurized to eliminate microbes detrimental to plant growth. The completed soil mixture may be supplied with the kit and is preferably supplied in the minipots 12 themselves so that they are ready for student use.

Also included with the supplies for the growth of the fast cycling Brassica plants would be the clear plastic support separators 26. Suitable pre-cut squares of cheese cloth may also be provided for germination, as well as a watering pipette for initial watering and chemical treatments. Rapidly dissolving tablets or capsules containing an anti-microbial agent, such as copper sulfate may be included for addition to the reservoir water for control of algae in the reservoir and in the wicking pad 16.

Figure 4:
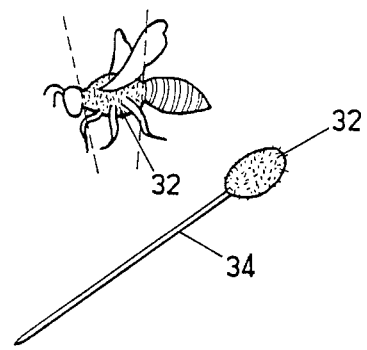
FIG. 4 is a perspective view illustrating the making of a bee stick.

For any given experiment to be formed for educational purposes with the fast cycling populations, one or more of a number of experimental supplies would be necessary. Among the necessary supplies could be rubbing alcohol, which would be useful for sterilizations. Tweezers would be included, which are useful for thinning plants during the growth cycle. In addition, for all experiments requiring cross-pollinations it would be necessary to incorporate a pollination tool, such as a bee stick. A bee stick is a toothpick with the thorax of a honey bee glued on one end so as to make use of the pollen gathering character of the hairy thorax of a bee. The fabrication and use of bee sticks is described in detail in Williams, "Bee-Sticks, an Aid in Pollinating Cruciferae," *Horticulture*, 15(6), p. 802-803, Dec. 1980. The bee sticks could be supplied preassembled or could be supplied in parts to be assembled by the students from bee cadavers, toothpicks and glue. The making of a bee stick is also illustrated in FIG. 4. The thorax 32 of a honey bee is dissected from the head and abdomen and is then glued to one end of a toothpick 34. The bee stick thus formed can be hand manipulated by the toothpick 34 so that the bee thorax 32 may be used for the pollination. It would be necessary to have appropriate measuring devices and marking and labeling devices, such as pot labels 30, to keep track of the individual plants.

The husbandry of fast-cycling Brassica plants in the apparatus of FIGS. 1-3 is relatively straightforward. Soil mixture is filled into each minipot 12 together with a small amount of N-P-K pellets. Three or four fast-cycling seeds are then sown in the soil and are covered with a layer of vermiculite. Water is then introduced by pipette into the minipot until it runs out the bottom pad 14. The porous wicking mat 16 is then saturated with water and the minipots 12 are placed on it. The reservoirs 20 are then filled with water. The lights 22 are then placed on and the plants illuminated twenty-four hours a day. If plants of B. campestris, i.e. CrGC-1, are used, the cotyledons emerge in two to three days. The plants are thinned with tweezers to one plant per pot. The plants flower in fourteen to sixteen days from seed moistening. The plant separators 16 separate the plants for pollination. Using bee sticks, pollen can be collected from designated male parents for placement on female parents. Twenty days after pollination, water is removed for three to four days. The siliques are cut and air dried in paper bags for five to seven days. The dried siliques can be rolled between the hands over a collecting pan to collect seed for the next generation.

Appropriate instructions, both general as to Brassica cultivation, and specific to the plants and experiment to be performed with each kit would be included describing this process in detail.

Within the basic kit as described heretofore, there would be added to it various materials appropriate for any given experiment. For example, for an experiment related to a specific trait or the demonstration of Mendelian inheritance, the specific seed stocks would need to be selected for their individual observable phenotypes as related to a particular experiment. For an educational effort directed to ecological pollution, potential chemical pollutants having an adverse effect upon plant growth could be supplied with the kit so that they could be applied to the plants without danger to the students so as to demonstrate the negative effect on plant growth as a result. Plant nutrients or hormonal plant growth regulators could be supplied to demonstrate their effect on plant growth. Antibiotics or herbicides could be supplied in small doses to demonstrate their adverse effect on plant growth as could parasites, pests or pathogens. Competitiveness could be determined by growing stocks together in the same pot or by including weed seeds selected to provide competition to the Brassica populations with the kit. Other biological symbionts could be provided to demonstrate their effects, either adverse or positive, on the growing plant populations.

The educational kit of the present invention in actual use would also include appropriate documentation. The documentation would include detailed teacher and student instructions on the husbandry of the Brassica plants as well as instructions on how to perform the demonstration or experiment of the particular kit. In addition, the documentation would preferably include general botanical information on the history and uses of Brassica and other relevant background information to enrich student and teacher learning.

It is understood that the present invention is not limited to the particular embodiments illustrated herein but embraces all such modified forms thereof as come within the scope of the following claims.

I claim:

1. An educational kit for the classroom study of fast-cycling Brassica plants comprising a compact plant growth environment for plants suitable for classroom use, including physical containers for plants, and a watering system to continually water plants in the containers with minimum maintenance; and a stock of seeds of fastcycling Brassica plants having an average growing cycle of not more than about sixty days and of a size appropriate for the compact growth environment, the seeds selected to yield plants having easily observable traits of educational interest.

2. An educational kit as claimed in claim 1 further comprising a quantity of a plant growth factor and wherein the trait selected for in the plants is high sensitivity to the plant growth factor so that easily observed differences will develop between groups of plants exposed to the growth factor and groups of similar plants not exposed.

3. An educational kit as claimed in claim 2 wherein the growth factor is a negative growth factor selected from the group consisting of antibiotics, herbicides, parasites, pathogens, pests and competitive plants.

4. An educational kit as claimed in claim 2 wherein the growth factor is a positive growth factor selected from the group consisting of plant nutrients, hormones and symbiots.

5. An educational kit as claimed in claim 1 further including hand pollination devices so that hand pollinations can be accomplished between selected plants.

6. An educational kit as claimed in claim 1 wherein the physical containers for the plants are small plant minipots having a hollow interior and a porous bottom pad.

7. An educational kit as claimed in claim 6 wherein the watering system includes a porous wicking pad onto which the minipots are placed and at least one water reservoir into which one end of the wicking pad extends.

8. An educational kit as claimed in claim 6 wherein an optimized soil mixture is provided in each of the minipots.

9. An educational kit as claimed in claim 1 wherein the Brassica seeds are selected from the group consisting of Brassica campestris (CrGC 1), Brassica nigra (CrGC 2), Brassica oleracea (CrGc 3), Brassica juncea (CrGC 4), Brassica napus (CrGC 5), and Brassica carinata (CrGC 6).

10. An educational kit according to claim 6 wherein the minipots are placed adjacent one another and are separated by vertical separators extending upward between the minipots, whereby the separators simulate trellises.

11. An educational kit according to claim 10 wherein the separator includes notches for holding string onto which the plants may climb.

12. An educational kit for the classroom study of plant genetics in fast-cycling Brassica plants comprising a compact plant growth environment including a physical plant containment, and a watering system; pollination tools for hand-pollination of plants; and at least two stocks of seeds of fast-cycling Brassica plants characterized by a characteristic average growing cycle under optimal conditions of not more than about sixty days, each of the two stocks having one of an allelic pair of chromosomes conditioning an easily observable phenotypic trait so that crosses of the two stocks and their progeny can be readily made and the phenotypes of the progeny observed.

13. An educational kit as claimed in claim 12 wherein the pollination tools include a bee thorax adhered to a small stick.

14. An educational kit as claimed in claim 12 wherein the watering system continually waters plants in the plant containment with minimal supervision.

15. An educational kit as claimed in claim 14 wherein the plant containment includes individual small plant minipots having a hollow interior and a porous bottom pad.

16. An educational kit as claimed in claim 15 wherein the watering system includes a porous wicking pad extending under the plant minipots and at least one water reservoir into which the wicking pad extends so that water is delivered to the minipots by capillary action.

17. A method of studying plant growth and plant genetics utilizing fast-cycling Brassica seeds, comprising:

sowing the seeds of fast-cycling Brassica plants in a compact plant growth environment for Brassica plants suitable for classroom use, including physical containers for the plants and a watering system for continually watering the plants in the containers with minimum maintenance; and providing sufficient light to allowing rapid growth of the plants;

wherein the seeds of the fast-cycling Brassica plants have been bred to develop into plants having a characteristic average growing cycle of not more than sixty days and having a size appropriate for the compact plant growth environment, the seeds being selected to yield plants having easily observable traits of educational interest.

18. The method of claim 17 wherein the Brassica seeds are selected from the group consisting of *Brassica compestris* (CrGC 1), *Brassica nigra* (CrGC 2), *Brassica oleracea* (CrGC 3), *Brassica juncea* (CrGC 4), *Brassica napus* (CrGC 5), and *Brassica carinata* (CrGC 6).

* * * * *

UNITED STATES PATENT AND TRADEMARK OFFICE
CERTIFICATE OF CORRECTION

PATENT NO. : 4,950,166

DATED : August 21, 1990

INVENTOR(S) : Williams, Paul H.

It is certified that error appears in the above-identified patent and that said Letters Patent is hereby corrected as shown below:

Column 1, after line 5, the following text should appear:

--STATEMENT REGARDING FEDERALLY SPONSORED RESEARCH

This invention was made with United States Government support awarded by the National Science Foundation (NSF), Grant No. MDR-8651604 and the United States Department of Agriculture (USDA) HATCH Funds. The United States Government has certain rights in this invention.--

Signed and Sealed this

Twenty-ninth Day of March, 1994

*Attest:*

BRUCE LEHMAN

*Attesting Officer*     Commissioner of Patents and Trademarks